(No Model.)
C. ROBERTS.
POTATO DIGGER.
No. 384,641. Patented June 19, 1888.
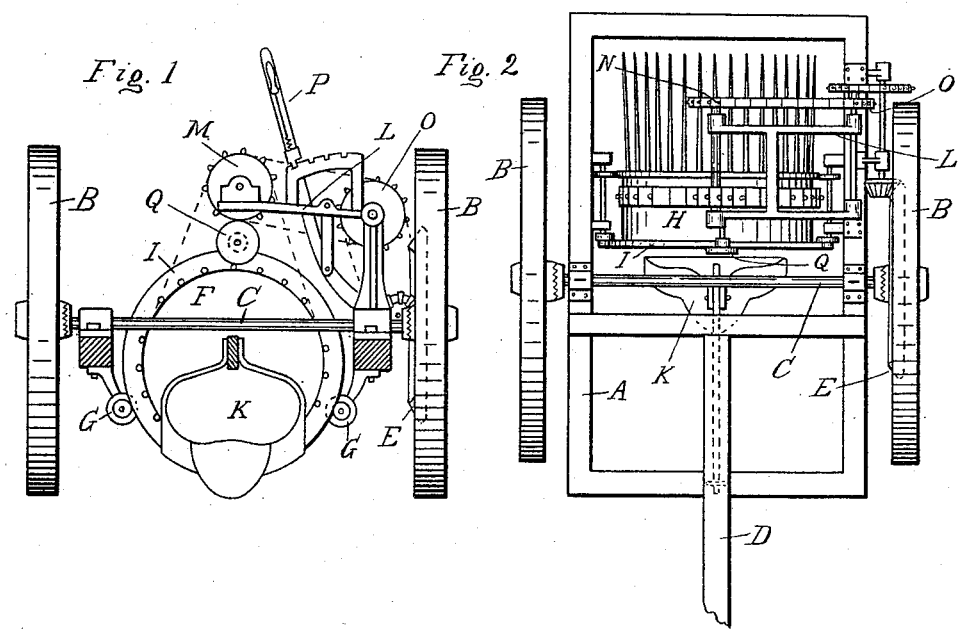
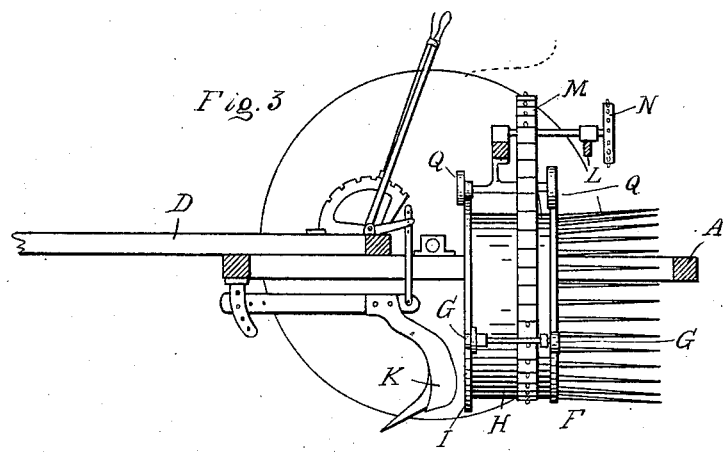
Witnesses:
P. M. Hulbert.
Inventor:
Cyrus Roberts.
By Thos. S. Sprague & Son
Att'ys.

UNITED STATES PATENT OFFICE.

CYRUS ROBERTS, OF THREE RIVERS, MICHIGAN.

POTATO-DIGGER.

SPECIFICATION forming part of Letters Patent No. 384,641, dated June 19, 1888.

Application filed November 12, 1887. Serial No. 254,971. (No model.)

*To all whom it may concern:*

Be it known that I, CYRUS ROBERTS, a citizen of the United States, residing at Three Rivers, in the county of St. Joseph and State of Michigan, have invented certain new and useful Improvements in Potato-Diggers, of which the following is a specification, reference being had therein to the accompanying drawings.

This invention relates to new and useful improvements in potato-diggers; and the invention consists, first, in the peculiar means for rotating the cage or drum, whereby the same is supported in position without the use of any central or other bearings, which are liable to obstruct the clear and open passage through the drum or cage; second, in the peculiar construction of the cage whereby all chance of weeds or potato-vines getting entangled in the cage or other parts of the machinery is entirely overcome, and, third, in the peculiar arrangement and construction of the parts whereby the device may be adjusted to dig at any depth desired, or be lifted up clear from the ground when in operation.

In the drawings which accompany this specification, Figure 1 is a vertical central cross-section of my improved potato-digger. Fig. 2 is a plan view thereof, and Fig. 3 is a central longitudinal section of the same.

A is the frame which supports the operating parts, and which is of any suitable shape to accomplish this object.

B are the drive-wheels which support the device, and C is the drive-axle upon which the wheels are secured by means of intervening clutches, as is usual in such machines.

D is the draft-pole secured to the frame.

E is a gear-wheel secured to one of the wheels for conveying motion to the rotating drum or cage F, which is supported upon suitable friction-rollers, G, below the center, and upon the periphery of the head of the cage.

The drum consists of the annular rim or head H, provided with the circular flange I, and a series of rearwardly-projecting tines, which are firmly secured to the head. These tines form a cylindrical cage or drum, which in the operation of the device is intended to revolve and sift the potatoes from the soil, permitting the latter to fall through the interstices between the tines, while the potates are discharged at the rear end on top of the ground. I preferably make the openings between the tines gradually enlarging toward the end. This may be done by spreading the tines outwardly, or by tapering them, for the purpose of preventing stones or other débris from wedging between.

The digging of the potatoes is performed by means of the scoop-plow K, secured in advance of the cage, preferably by means of the plow-beam pivotally secured at its forward end, provided at its rear end with adjusting devices operated by the driver, arranged in proximity to the driver's seat, and whereby the plow may be raised and lowered from and to the work, or be adjusted to plow at any desired depth. The rear end of this plow is of suitable height to freely discharge into the cage.

The means for rotating the cage or drum consists in the sprocket-chain which passes around the head of the drum and over the sprocket-wheel M supported on top of the cage by means of the hinged frame L, and another sprocket-wheel, N, is secured upon the same shaft with the sprocket-wheel M and derives its motion by the sprocket-wheel O and suitable intermediate gearing from the gear-wheel E upon the drive-wheel, a suitable clutch (not shown) being placed at any convenient portion of the drive mechanism to throw it in and out of gear.

I preferably use but one sprocket-chain to rotate the cage or drum, and apply this chain some distance back of the front end of the cage, and to get the necessary stability of the cage and prevent its displacement I arrange in addition to the bearing-rollers G, which support the weight of the cage, a suitable roller or rollers, Q', on top of the cage. It is obvious, however, that the same object may be obtained by using more than one sprocket-chain.

P is a lever arranged within proximity of the driver's seat for raising and lowering the hinged frame L, and as this frame also carries the cage, it is plain that a means is thereby provided for elevating the whole cage from the ground.

It will be seen that the means for adjusting the plow and the means for adjusting the cage are independent of each other, and that the cage is of a novel construction, not known or used heretofore, and that the tines are not supported at their rear ends. This, in practice, forms an important point in the operation of such a machine, as experience has demonstrated that every obstruction is liable to catch the vines or weeds, and very soon becomes choked and ineffective. In my cage, on the contrary, if there should occur an accumulation of débris or too large weight of ground the tines, being made of spring-steel, will sufficiently spread to effect a quick discharge.

What I claim as my invention is—

1. The combination, with a revolving cage of a potato-digger, of circumferential bearings supporting said cage in position, a drive-chain passing around the head of the cage, and a sprocket-wheel on top of the cage, a hinged frame upon which said sprocket-wheel is journaled, and a lever for raising and lowering said hinged frame, substantially as described.

2. In a potato-digger, a revolving cage or drum, consisting of the annular head and of spring-tines secured thereto and projecting rearwardly from that head, with their rear ends free and having gradually-tapering enlarging interstices between the tines, substantially as described.

3. In a potato-digger, the combination of the drive-wheels, the frame supporting the parts, a scoop-plow provided with devices for independently raising and lowering it, a hinged frame, and a revolving drum supported on circumferential bearings or rollers and provided with means for vertically adjusting it independent of the plow, substantially as described.

In testimony whereof I affix my signature, in presence of two witnesses, this 18th day of October, 1887.

CYRUS ROBERTS.

Witnesses:
H. S. SPRAGUE,
P. M. HULBERT.